United States Patent Office 2,889,332
Patented June 2, 1959

2,889,332
PROCESS FOR PRODUCTION OF HYDANTOINS

James N. Coker and Melvin Fields, Wilmington, Del., and Arthur O. Rogers, Lewiston, N.Y., assignors to E. I. du Pont de Nemours and Company, Wilmington, Del., a corporation of Delaware No Drawing. Application September 17, 1957
Serial No. 684,402

5 Claims. (Cl. 260—309.5)

This invention is concerned with the preparation of hydantoins, and is more particularly concerned with the conversion of azomethine compounds to hydantoins.

It is known that aldehydes and ketones can be converted to hydantoins with ammonium carbonate and cyanides, and that the resulting hydantoins can readily be hydrolyzed to form valuable amino acids. Suitable methods are disclosed in the publications, H. T. Bucherer et al., "Über die Bildung substituierter Hydantoine aus Aldehyden und Ketonen," J. Prakt. Chem., 141, 5–43 (1934), and W. Gebhardt, "Über Hydantoine, Thiohydantoine, Sulfothiazolidon- und Sulfothiazolindoniminderivate," diss. Technischen Hochschule Munchen, 38 pages (1935). However, the preparation and isolation of aldehyde or ketone starting materials of suitable stability and reactivity for the conversion has imposed serious practical limitations on the hydantoins and corresponding amino acids which can be prepared commercially.

It is an object of this invention to provide a more generally useful process for preparing hydantoins which does not depend upon isolation of aldehyde or ketone starting reactants. Other objects will become apparent from the specification and claims.

In accordance with this invention azomethine compounds of the general formula,

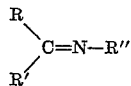

wherein R is an aliphatically saturated hydrocarbon group, R' is hydrogen or an aliphatically saturated hydrocarbon group, and R" is an aliphatically saturated hydrocarbon group, are readily converted to hydantoins by heating a reaction mixture of the azomethine compound and a solution containing ammonium ions, $CO_2$ or carbonate ions and cyanide ions. The hydrocarbon groups represented by R, R' and R" may be alike or different and are preferably lower alkyl or aryl of no more than six carbon atoms.

In the process of this invention, an azomethine compound having hydrocarbon groups as the only substituents on the azomethine nucleus, e.g., an N-alkylidene or N-aralkyidene arylamine or alkylamine, is heated in a reaction mixture containing ammonium ions, carbonate ions and cyanide ions in solution in an inert polar solvent, preferably water or a lower alcohol or a mixture thereof. Ammonium carbonate and hydrogen cyanide are the most convenient sources of the required ions, but other materials can obviously be used to form these ions in solution. Thus carbon dioxide and ammonia or various ammonium salts can be added separately, in place of ammonium carbonate, and metal cyanides can be used in place of hydrogen cyanide. Solid carbon dioxide can be added to increase the concentration of carbon dioxide in solution. The addition of a small amount of sodium hydrogen sulfite or other bisulfite will usually increase the yield, but is not essential. The yield may also be improved by complete exclusion of oxygen from the reaction. A reaction temperature of about 40° C. to about 220° C. is suitable, with pressure being required at the higher temperatures. A reaction temperature of 100° to 150° C. is preferred. At about 100° C. the reaction is usually complete in about 3 to 4 hours. A relatively insoluble hydantoin product can be separated from the reaction mixture by filtration. The yield can frequently be improved by concentrating the filtrate or salting out soluble product with neutral salts, e.g., sodium sulfate. The hydantoin is purified by recrystallization from water or other solvent.

The reaction mechanism is not understood, but the overall result is as follows:

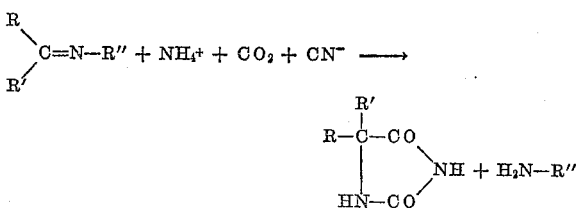

The primary amine by-product of the reaction is readily recovered for use in preparing additional starting material.

The process is further illustrated by the specific embodiments of the invention shown in the examples, in which parts are by weight.

Example I

A mixture of 12.7 parts N-benzylidene aniline, 11 parts ammonium carbonate, 1 part sodium hydrogen sulfite, 3 parts hydrogen cyanide, 40 parts methanol and 40 parts water was heated in a pressure vessel at 100° C. for 3½ to 4 hours. The solvent was evaporated and the residue was extracted with ethanol. Crystallization from ethanol gave 10 parts (82% yield) of 5-phenyl hydantoin having a melting point of 183°–184° C.

Example II

A mixture of 8.4 parts N-benzylidene-methylamine, 11 parts ammonium carbonate, 1 part sodium hydrogen sulfite, 3 parts hydrogen cyanide, 40 parts methanol and 40 parts water was heated in a pressure vessel at 100° C. for 3½ to 4 hours. The solvent was evaporated and 7 parts (57% yield) of crude 5-phenyl hydantoin was recovered from the residue by extraction with ethanol. This crude product has a melting point of 177°–178° C. Recrystallization from alcohol raised the melting point to 184° C.

The azomethine compounds used as starting materials in the process of this invention are known compounds. The hydantoin products have previously been prepared by other methods and are known to produce amino-acids upon hydrolysis. The invention, therefore, is of particular importance as providing an improved route to valuable amino acids.

Since many different embodiments of the invention may be made without departing from the spirit and scope thereof, it is to be understood that the invention is not limited by the specific illustrations except to the extent defined in the following claims.

We claim:

1. The process for producing a hydantoin which comprises heating an azomethine compound having hydrocarbon groups as the only substituents on the azomethine nucleus in a reaction mixture containing ammonium ions, carbonate ions and cyanide ions in solution.

2. The process for producing a hydantoin which comprises heating a reaction mixture of an N-aralkylidene arylamine and a solution containing ammonium ions, carbonate ions and cyanide ions at a temperature of 40° to 220° C. and recovering the hydantoin product.

3. The process for producing a hydantoin which comprises heating a reaction mixture of an N-aralkylidene alkylamine and a solution containing ammonium ions, carbonate ions and cyanide ions at a temperature of 40° to 220° C. and recovering the hydantoin product.

4. The process for producing 5-phenyl hydantoin which comprises heating a reaction mixture of N-benzylidene-arylamine and a solution containing ammonium ions, carbonate ions and cyanide ions at a temperature of 40° to 220° C. and recovering the hydantoin product.

5. The process for producing 5-phenyl hydantoin which comprises heating a reaction mixture of N-benzylidene-alkylamine and a solution containing ammonium ions, carbonate ions and cyanide ions at a temperature of 40° to 220° C. and recovering the hydantoin product.

References Cited in the file of this patent
UNITED STATES PATENTS

| | | |
|---|---|---|
| 2,717,252 | Holland | Sept. 6, 1955 |
| 2,717,253 | Holland | Sept. 6, 1955 |